(12) United States Patent
Applegate

(10) Patent No.: US 8,844,060 B2
(45) Date of Patent: Sep. 23, 2014

(54) METHOD AND SYSTEM FOR USB WITH AN INTEGRATED CRYPTO IGNITION KEY

(75) Inventor: Aaron Applegate, Chandler, AZ (US)

(73) Assignee: Exelis Inc., McLean, VA (US)

(*) Notice: Subject to any disclaimer, the term of this patent is extended or adjusted under 35 U.S.C. 154(b) by 0 days.

(21) Appl. No.: 13/082,010

(22) Filed: Apr. 7, 2011

(65) Prior Publication Data

US 2012/0260100 A1 Oct. 11, 2012

(51) Int. Cl.
| G06F 21/00 | (2013.01) |
| G06F 21/34 | (2013.01) |
| G06F 21/85 | (2013.01) |
| G06F 21/79 | (2013.01) |
| G06F 21/72 | (2013.01) |
| H04L 9/08 | (2006.01) |

(52) U.S. Cl.
CPC ............ *G06F 21/34* (2013.01); *G06F 21/85* (2013.01); *G06F 21/79* (2013.01); *G06F 21/72* (2013.01); *G06F 2221/2153* (2013.01); *G06F 2221/2107* (2013.01); *H04L 9/0897* (2013.01)
USPC .......................................................... 726/34

(58) Field of Classification Search
CPC ......... G06F 21/70; G06F 21/71; G06F 21/60; G06F 21/62
USPC ............... 726/34, 16, 20; 713/192, 194
See application file for complete search history.

(56) References Cited

U.S. PATENT DOCUMENTS

| 7,184,274 | B2 | 2/2007 | Wu et al. | |
| 2007/0226517 | A1* | 9/2007 | O'Brien et al. | 713/189 |
| 2008/0064271 | A1* | 3/2008 | Hiew et al. | 439/892 |
| 2008/0261450 | A1 | 10/2008 | Nguyen et al. | |
| 2009/0182931 | A1* | 7/2009 | Gill et al. | 711/103 |

OTHER PUBLICATIONS

International Search Report and Written Opinion mailed Jun. 21, 2012 in PCT/US2012/032749.
International Preliminary Report on Patentability dated Oct. 8, 2013 in PCT/US2012/032749.

* cited by examiner

*Primary Examiner* — Edward Zee
(74) *Attorney, Agent, or Firm* — Davidson Berquist Jackson & Gowdey LLP

(57) ABSTRACT

Methods and systems provide a USB memory stick protected by an attached CIK. This system includes a USB memory stick composed of a main body and a cap. The main body houses the memory for data storage as well as the encrypt/decrypt device and ancillary circuitry. The cap houses the CIK, simultaneously providing a storage mechanism for the CIK as well as keeping the CIK obscured from plain view and visual detection.

8 Claims, 3 Drawing Sheets

METHOD AND SYSTEM FOR USB WITH AN INTEGRATED CRYPTO IGNITION KEY

This generally relates to crypto ignition keys, and more specifically relates to a crypto ignition key for use with a USB drive.

BACKGROUND

A crypto ignition key ("CIK") is a device or electronic key used to unlock the secure mode of crypto-equipment. Conventional crypto ignition keys provide a level of authentication prior to allowing a user access to use the equipment protected by the CIK by requiring that the CIK be read by the system and authenticated prior to operation of the protected equipment.

Conventional CIKs are held separately from the protected equipment and typically only connected to the protected equipment when the user desires to operate the protected equipment. When a user wishes to render protected equipment non-operational, the CIK is removed.

Conventional CIKs come in various shapes and sizes, but most are no larger than a traditional lock key. The combination of the small size of conventional CIKs and their being held separately from the protected equipment make them relatively easy to lose or otherwise misplace. Once a CIK is lost, the protected equipment is unusable until the CIK is found or replaced.

Conventional USB memory sticks comprise a flash memory data storage device integrated with a Universal Serial Bus ("USB") interface. USB flash drives are typically removable and rewritable, and physically much smaller than a floppy disk, CD, or DVD. They have large storage capacities and may, for example combine allowance of up to 1 million write or erase cycles with up to a 10-year data retention cycle. Conventional USB memory sticks are used in a wide variety of ways. They may be employed for personal data transport, to transfer recovery and antivirus software to infected PCs, to carry applications so they can be run on a host computer without installation, or to backup entire databases. Some system and network administrators load them with configuration information and software used for system maintenance, troubleshooting and recovery. Bootable USB memory sticks may be used to allow launch of an operating system. Because of the breadth and value of information stored on conventional USB memory sticks, securing and limiting access to this information is desirable.

Accordingly, there is a desire for a solution to these and other related problems.

SUMMARY

In accordance with methods and systems consistent with the present invention, a system is provided for a USB drive with a cryptographic ignition key, comprising the USB drive configured to be activated by the cryptographic ignition key. The system further comprises the cryptographic ignition key configured to connect to the USB drive and activate the USB drive.

In one implementation, a USB drive for use with a cryptographic ignition key is provided, comprising the USB drive configured to be activated by the cryptographic ignition key and comprising a connector configured to connect to the cryptographic ignition key configured to activate the USB drive, wherein the USB drive does not activate without the cryptographic ignition key.

In another implementation, a cryptographic ignition key is provided comprising the cryptographic ignition key configured to connect to a USB drive and activate the USB drive upon connection. The cryptographic ignition key comprises a connector configured to connect to a USB drive.

In yet another implementation, a method in a data processing system for a USB drive with a cryptographic ignition key is provided, comprising connecting a USB drive configured to be activated by the cryptographic ignition key to the cryptographic ignition key. The method further comprises activating the USB drive in response to the connection with the cryptographic ignition key.

DETAILED DESCRIPTION

Methods and systems in accordance with the present invention provide a USB memory stick protected by an attached CIK. This system includes a USB memory stick composed of a main body and a cap. The main body houses the memory for data storage as well as the encrypt/decrypt device and ancillary circuitry. The cap houses the CIK, simultaneously providing a storage mechanism for the CIK as well as keeping the CIK obscured from plain view and visual detection.

Figure 1:
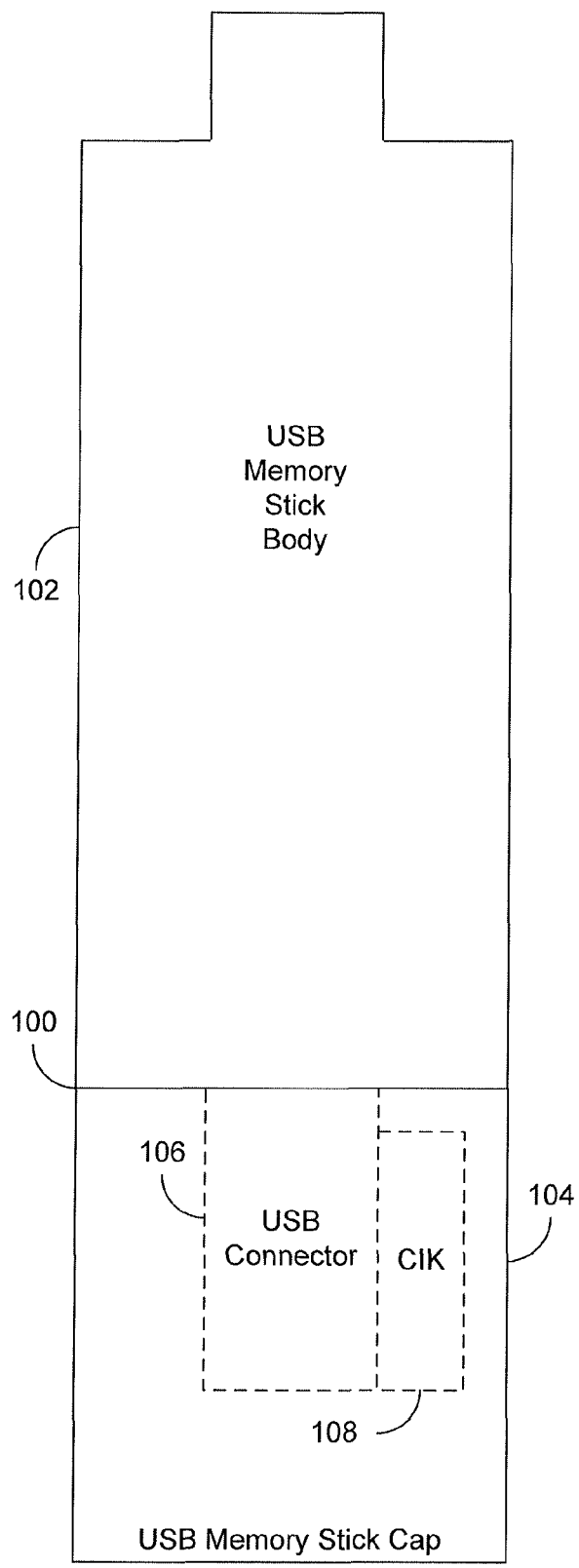
FIG. 1 illustrates an exemplary embodiment of a USB memory stick and cap with an integrated crypto ignition key made in accordance with methods and systems consistent with the present invention.

FIG. 1 illustrates an exemplary embodiment of a USB memory stick and cap with an integrated crypto ignition key made in accordance with methods and systems consistent with the present invention. USB Memory Stick 100 comprises USB Memory Stick Body 102 and USB Memory Stick Cap 104. USB Memory Stick Body 102 houses the memory for data storage, the encrypt/decrypt device, and the ancillary circuitry and other electronic components of USB Memory Stick 100. In the embodiment shown in FIG. 1, USB Memory Stick 100 is in the stored position, with USB Memory Stick Cap 104 placed over USB Connector 106, which may be used to connect USB Memory Stick 100 to any device with a USB port, for example by plugging USB Connector 106 into a USB port.

CIK 108 forms part of the activation mechanism for USB Memory Stick 100. In some embodiments, CIK 108 may be built into the inside of USB Memory Stick Cap 104. This allows for CIK 108 to be easily stored and located while simultaneously keeping CIK 108 hidden within the cap so that it is not easily visible during either storage or activation of USB Memory Stick 100. In the embodiment shown in FIG. 1, wherein USB Memory Stick Cap 104 is in the storage position, covering USB Connector 106, CIK 108 is not connected to USB Memory Stick 100, which is thus rendered inactive.

Figure 2:
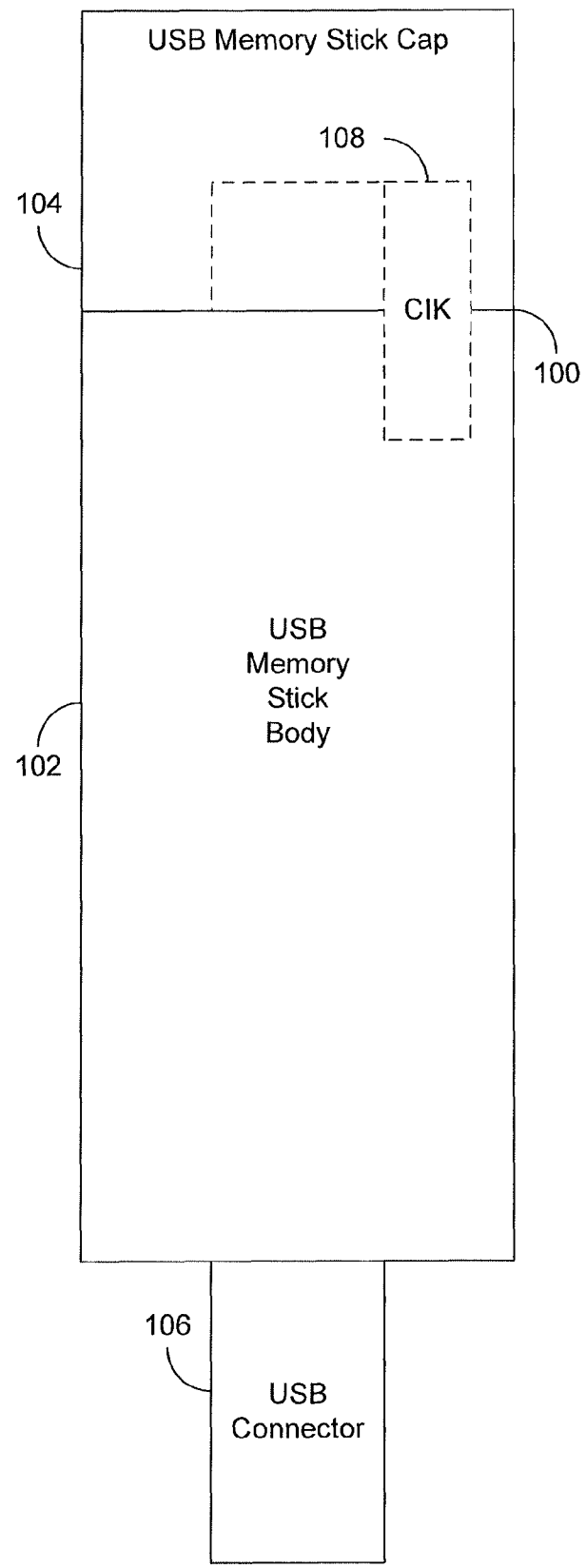
FIG. 2 depicts another exemplary embodiment of a USB memory stick and cap with an integrated crypto ignition key in accordance with methods and systems consistent with the present invention.

FIG. 2 depicts another exemplary embodiment of a USB memory stick and cap with an integrated crypto ignition key in accordance with methods and systems consistent with the present invention. In the embodiment shown in FIG. 2, USB Memory Stick 100 is in the activated position, with USB Memory Stick Cap 104 removed from over USB Connector 106, and placed on the distal end of USB Memory Stick 100. CIK 108 is housed inside USB Memory Stick Cap 104. In the embodiment shown in FIG. 2, wherein USB Memory Stick Cap 104 is in the activated position, on the distal end of USB Memory Stick 100, CIK 108 is thereby inserted into a slot located on USB Memory Stick Body 102, activating USB Memory Stick 100.

Figure 3:
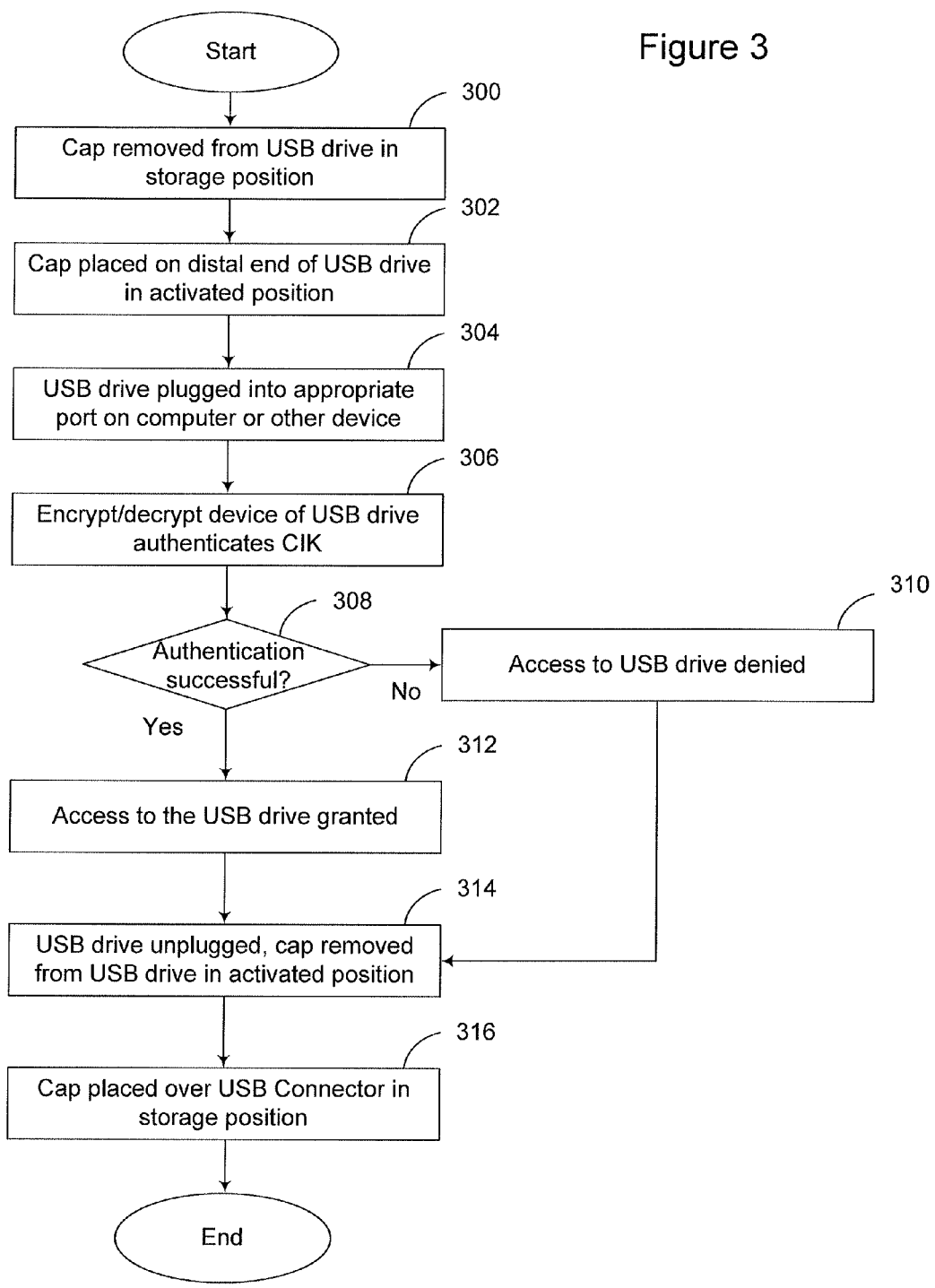
FIG. 3 depicts steps in an exemplary method for use of a USB memory stick and cap with an integrated crypto ignition key in accordance with methods and systems consistent with the present invention.

FIG. 3 depicts steps in an exemplary method for use of a USB memory stick and cap with an integrated crypto ignition key in accordance with methods and systems consistent with the present invention. First, the user may remove USB Memory Stick Cap 104, containing CIK 108, from the USB Memory Stick 100 if it is in the storage position (step 300). Next, the user may place USB Memory Stick Cap 104 on the distal end of USB Memory Stick 100 so that CIK 108 is inserted into a slot located on USB Memory Stick Body 102, thereby activating USB Memory Stick 100 (step 302). The activated USB Memory Stick 100 may then be plugged into any USB port, for example the USB port on a computer (step 304). Once the USB Memory Stick 100 is plugged into a USB port, the encrypt/decrypt device resident in the USB Memory Stick Body 102 authenticates the CIK device 108 (step 306). If authentication is successful (step 308), the encrypt/decrypt device allows access (read, write, erase, etc.) (step 310) to the secured data resident in the memory of the USB Memory Stick 100. If the authentication process is not successful (step 308), the encrypt/decrypt device prevents access to the memory (step 312). Once the user has finished using USB Memory Stick 100, it may be unplugged from the computer and deactivated by removing USB Memory Stick Cap 104 from the distal end of USB Memory Stick 100 so that CIK 108 is removed from the slot located on USB Memory Stick Body 102 (step 314). Finally, the user may restore USB Memory Stick Cap 104 to the storage position by placing it on USB Memory Stick 100 so that it covers USB Connector 106 (step 316).

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A system for a USB drive with a cryptographic ignition key, comprising:
   the USB drive configured to be activated by the cryptographic ignition key;
   the cryptographic ignition key configured to physically locally connect to the USB drive and activate the USB drive via the physical local connection; and
   a cap for the USB drive, wherein the cap comprises the cryptographic ignition key, and wherein the cap is configured to be placed on the front of the USB drive and the back of the USB drive, and electronically engage the cryptographic ignition key with the USB drive when placed on the back of the USB drive.

2. The system of claim 1, wherein the USB drive does not activate without the cryptographic ignition key.

3. The system of claim 1, wherein the cap stores the cryptographic ignition key when placed on the front of the USB drive.

4. The system of claim 1, further comprising:
   the USB drive comprising a connector to connect the cryptographic ignition key to the USB drive; and
   the cryptographic ignition key configured to connect to the USB drive via the connector.

5. The system of claim 1, wherein data on the USB drive is encrypted and the cryptographic ignition key activates decryption of the encrypted data.

6. A method in a data processing system for a USB drive with a cryptographic ignition key, comprising:
   physically locally connecting a the USB drive configured to be activated by the cryptographic ignition key to the cryptographic ignition key;
   activating the USB drive in response to the physical local connection with the cryptographic ignition key; and
   removing a cap comprising the cryptographic ignition key from the front of the USB drive, and placing the cap on the back of the USB drive thereby electronically engaging the cryptographic ignition key with the USB drive.

7. The method of claim 6, wherein data on the USB drive is encrypted and the method further comprises activating decryption of the encrypted data upon the engagement of the cryptographic ignition key with the USB drive.

8. The method of claim 6, further comprising removing the cap from the back of the USB drive, thereby disengaging the cryptographic ignition key from the USB drive and deactivating the USB drive.

\* \* \* \* \*

UNITED STATES PATENT AND TRADEMARK OFFICE
CERTIFICATE OF CORRECTION

PATENT NO. : 8,844,060 B2  
APPLICATION NO. : 13/082010  
DATED : September 23, 2014  
INVENTOR(S) : Aaron Applegate Page 1 of 1

It is certified that error appears in the above-identified patent and that said Letters Patent is hereby corrected as shown below:

In the Claims,

Col. 4, line 30, should read --physically locally connecting the USB drive configured--.

Signed and Sealed this
Second Day of December, 2014

Michelle K. Lee
*Deputy Director of the United States Patent and Trademark Office*